Feb. 3, 1970    W. BAER    3,492,820
JET DRIVE FOR WATER VEHICLES
Filed June 3, 1968

INVENTOR.
Wolfgang Baer
BY

United States Patent Office 3,492,820
Patented Feb. 3, 1970

3,492,820
JET DRIVE FOR WATER VEHICLES
Wolfgang Baer, Heidenheim-Mergelstetten, Germany, assignor to J. M. Voith GmbH. Maschinenfabrik, Heidenheim, Germany
Filed June 3, 1968, Ser. No. 733,948
Claims priority, application Germany, June 3, 1967, 1,506,813
Int. Cl. B63h 11/12; F02c 3/02; F04d 13/02
U.S. Cl. 60—221                                      6 Claims

ABSTRACT OF THE DISCLOSURE

A jet drive for water vehicles in which the driving gas conveying means is formed by a rotatable hollow shaft, the outer end of which is provided with segmental nozzle means and cover segments adjacent thereto, while outwardly of said nozzle means there is arranged a nest of thrust tubes of which during the operation of the drive, radially arranged groups are successively brought into alignment with the nozzle means after being loaded with water while simultaneously other radially arranged groups of tubes are temporarily covered up by said cover segments.

---

The present invention relates to a jet drive for water vehicles which comprises driving gas producing means or a source of driving gas, thrust tubes arranged in a honeycomb manner and open at the front and rear ends thereof while extending in the driving direction of the respective water vehicle, and means for feeding driving gas from the gas producer to the thrust tubes.

While with a jet drive for air vehicles it is possible to employ the ejection of combustion gases directly as forward driving power, this method meets with considerable difficulties when applied to water vehicles. These difficulties are due primarily to the low degree of efficiency in view of the high exit energy of the combustion gases and also due to operational complications.

For purposes of minimizing these drawbacks, it is known with jet drives for water vehicles not directly to eject the combustion gases, but instead so to speak, to load them with water in order to increase the ejected mass and to reduce the exit speed correspondingly. In this connection, it is known intermittently to eject the water by the expanding combustion gases from individual so-called thrust tubes and to continuously feed water from a pump—driven by a combustion gases actuated turbine—to a so-called chamber wheel with thrust tubes arranged in a honeycomb-like manner. The water contained in the individual chambers is by means of the combustion gases ejected toward the rear.

With these heretofore known jet drives for water vehicles, the combustion gas is produced either in a central combustion chamber of the jet drive, or fed to the jet drive from the ship body through connecting supports. In view of the necessary deviations the gas supply encounters considerable losses. The rotating parts must be journalled outside the ship body in the driving mechanism housed in a kind of nacelle, and furthermore, the thrust has to be absorbed by a thrust bearing in said driving mechanism.

It is an object of this invention to provide a jet drive for water vehicles which will overcome the above mentioned drawbacks.

It is another object of this invention to provide a jet drive for water vehicles, in which the driving gas conveying means will, when the driving gas supply is shut off, operate in the manner of a ship propeller.

These and other objects and advantages of the invention will appear more clearly from the following specification in connection with the accompanying drawing, in which:

FIGURE 1 is a vertical longitudinal section through the stern of a ship equipped with a jet drive according to the invention.

FIGURE 2 diagrammatically illustrates a cross section through the nest of thrust tubes, said section being taken along the line II—II of FIG. 1.

Figure 1:
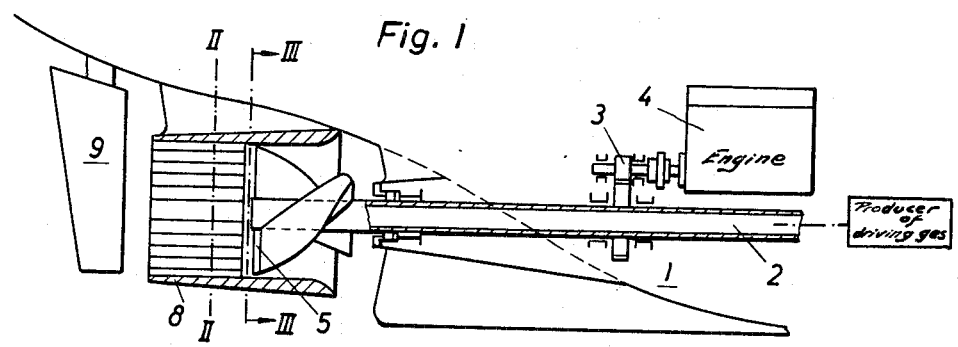
Figure 2:
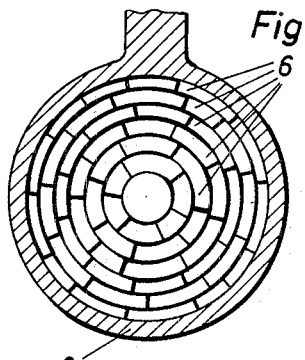
Figure 3:
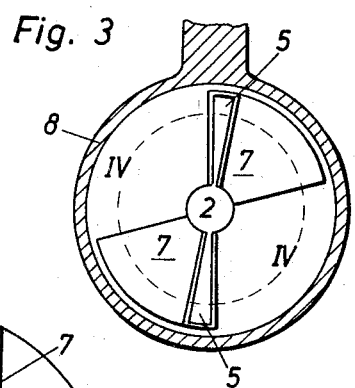
FIGURE 3 is a cross section through the nest of thrust tubes taken along the line III—III of FIG. 1.
Figure 4:
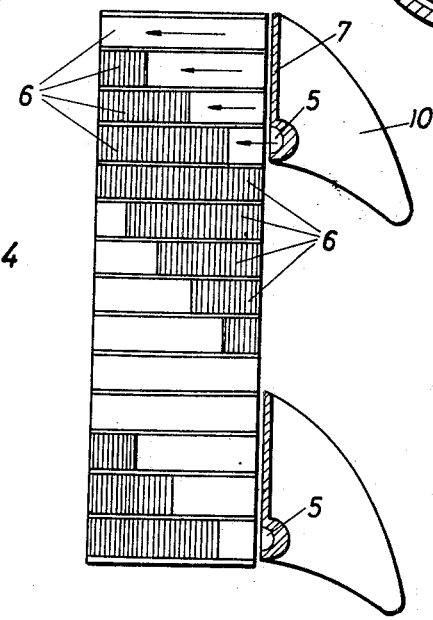
FIGURE 4 shows a development of a section taken along the line IV—IV of FIG. 3, all of FIGS. 2–4 being on a somewhat larger scale than FIG. 1.

The above mentioned objects have been realized according to the present invention by designing the driving gas feeding or conveying means as a hollow shaft coaxially arranged with regard to the thrust tube nest and provided with a drive independent of the driving gas producing means, while that end of said hollow shaft which faces said nest of thrust tubes is provided with at least one segmental gas supply nozzle; preferably a plurality of segmental gas supply nozzles uniformly distributed over the circumference of said hollow shaft end, and is also provided with a number of segmental cover surfaces corresponding in number to the number of said nozzles. In this way, the working medium such as compressed air, highly compressed combustion gas or the like, produced in the interior of the ship is withdrawn from the ship body and passed through a substantially straight and horizontally located pipe line which is formed by a hollow shaft radially and axially journalled in the interior of the ship and provided with a drive. The outer end of said hollow shaft is provided with preferably two or more segmental gas feeding nozzles uniformly distributed over the periphery of said outer shaft end and having adjacent thereto and extending in circumferential direction of said shaft segmental surface cover members in such a way that during the rotation of said hollow shaft the individual thrust tubes of said honeycomb-shaped nest of thrust tubes at their front end are alternately exposed to the driving flow and charged with liquid, then move into alignment with said gas nozzles, and finally come into alignment with said segmental surface cover members.

According to a further development of the present invention, the rear end of the hollow shaft, especially in connection with the cover segment or segments is so designed that the hollow shaft will act as axial pump or screw pump and can serve for accelerating the filling water for the thrust tubes. The length of the thrust tubes and the size and number of the gas conveying nozzles as well as the cover segments are so selected with regard to each other that at the respective given speed of the gas conveying shaft, the gas at the end of the expansion period will be approximately under the pressure which prevails in the vicinity of the exit ends of the thrust tubes or so that a desired expansion ratio will be realized.

It has also been found advantageous to surround the thrust tube nest or system in a nozzle-like manner by a cover or wall or cowl in order in this way to additionally obtain the so-called nozzle effect.

The arrangement according to the present invention has the additional advantage that the hollow shaft which serves for conveying the driving gas can without difficulties be driven in such a way that the hollow shaft with the screw pump designed cover segments will act as auxiliary driving propeller for the ship, especially in channel or river traffic. The gas supplier will also work as ship propeller when the driving gas supply is turned off.

Referring now to the drawing in detail, a hollow shaft 2 is axially and radially rotatably journallel in the stern 1 and is adapted to be driven by an engine 4 through the intervention of a pair of gears 3. At the inner end, the hollow shaft 2 is, through a suitable connection, connected to a driving gas producer indicated diagrammatically only. The outer end of the hollow shaft ends in two narrow segmental gas conveying nozzles 5. These nozzles radially extend over the six coaxial rings of thrust tubes 6, one ring being located within the other. Each nozzle 5 is in the circumferential direction thereof followed by a cover segment 7 or segmental member 7 having a cover surface, which has the design of propeller blades or blades of a screw pump. The thrust tube nest or system is enclosed by an annular nozzle 8 or cowl, and behind the latter there is arranged an adjustable rudder 9.

In view of the segemental design of the gas conveying nozzles and the cover segments it will be realized that for the respective raked circular surface along each radius, uniform filling and covering periods and uniform charging times for the filling with liquid will be obtained. The profile or contour 10 of the cover segments serving as propeller blades is so to be selected that with the operational load and speed a shock-free inlet and outlet will be realized. The rudder may, in a manner known per se, be so designed that by a corresponding adjustment or pivoting of the rudder the water gas jet leaving the thrust tubes can, whenever desired, be deviated toward the front in order in this way to exert a braking effect upon the ship.

It is, of course, to be understood that the present invention is, by no means, limited to the specific showing in the drawing, which merely represents an example of realizing the invention.

What I claim is:

1. In combination with a ship body, a jet drive for water vehicles, which includes: a hollow shaft rotatably journalled in said ship body for conveying driving gas to the outer end of the said shaft, driving means drivingly connected to said hollow shaft for rotating the same, a nest of thrust tubes arranged adjacent said outer end of said shaft with the central axis of said nest substantially in axial alignment with the axis of said shaft, said outer end of said shaft being adjacent to said nest of said tubes and being provided with segmental gas feeding nozzle means and adjacent cover segments corresponding in number to the number of said nozzle means.

2. An arrangement according to claim 1, in which the rear end of said hollow shaft together with said cover segments forms a screw pump operable to accelerate the flow of filling water for said thrust tubes.

3. An arrangement according to claim 1, in which the length of said thrust tubes and the size and number of the gas feeding nozzle means and of the cover segments are so selected with regard to each other that at a given speed of the gas conveying shaft the pressure of the gas at the end of the expansion period will aproximately equal the pressure prevailing in the vicinity of the exist ends of said thrust tubes.

4. An arrangement according to claim 1, in which the length of said thrust tubes and the size and number of the gas feeding nozzle means and of the cover segments are so selected with regard to each other that a desired expansion ratio will be obtained.

5. An arrangement according to claim 1, which includes cowl means surrounding said nest of thrust tubes in a nozzle-like manner.

6. An arrangement according to claim 1, in which said driving means drivingly connected to said hollow shaft is formed by an engine of such power that said hollow shaft in cooperation with said cover segments is adapted to operate as auxiliary ship propeller.

References Cited

UNITED STATES PATENTS

| | | | |
|---|---|---|---|
| 1,498,919 | 6/1924 | Jensen | 60—222 |
| 2,943,440 | 7/1960 | Andras | 60—221 |

MARK NEWMAN, Primary Examiner

H. D. HERRMANN, Assistant Examiner

U.S. Cl. X.R.

60—39.45; 103—87; 115—11, 34; 170—135.4